(12) United States Patent
Blaiszik et al.

(10) Patent No.: US 8,703,285 B2
(45) Date of Patent: Apr. 22, 2014

(54) INTERFACIAL FUNCTIONALIZATION FOR SELF-HEALING COMPOSITES

(75) Inventors: Benjamin J. Blaiszik, Urbana, IL (US); Jericho L. Moll, Urbana, IL (US); Brett A. Beiermann, Champaign, IL (US); Scott R. White, Champaign, IL (US); Nancy R. Sottos, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 319 days.

(21) Appl. No.: 12/543,206

(22) Filed: Aug. 18, 2009

(65) Prior Publication Data

US 2010/0075134 A1 Mar. 25, 2010

Related U.S. Application Data

(60) Provisional application No. 61/090,116, filed on Aug. 19, 2008.

(51) Int. Cl.
*C08L 63/00* (2006.01)
*B32B 27/18* (2006.01)

(52) U.S. Cl.
USPC .................. 428/321.5; 428/408

(58) Field of Classification Search
USPC .................................... 428/321.5
See application file for complete search history.

(56) References Cited

U.S. PATENT DOCUMENTS

| | | | |
|---|---|---|---|
| 6,518,330 B2 | 2/2003 | White et al. | |
| 6,858,659 B2 | 2/2005 | White et al. | |
| 7,566,747 B2 | 7/2009 | Moore et al. | |
| 7,569,625 B2 | 8/2009 | Keller et al. | |
| 7,612,152 B2 | 11/2009 | Braun et al. | |
| 7,723,405 B2 | 5/2010 | Braun et al. | |
| 2006/0111469 A1 | 5/2006 | White et al. | |
| 2007/0087198 A1* | 4/2007 | Dry | 428/408 |
| 2008/0241541 A1* | 10/2008 | Conrad et al. | 428/402.24 |
| 2008/0299391 A1 | 12/2008 | White et al. | |
| 2008/0305343 A1 | 12/2008 | Toohey et al. | |
| 2009/0181254 A1 | 7/2009 | White et al. | |
| 2009/0191402 A1 | 7/2009 | Beiermann et al. | |
| 2010/0206088 A1 | 8/2010 | Potisek et al. | |
| 2011/0039980 A1 | 2/2011 | Caruso et al. | |

OTHER PUBLICATIONS

Rule et al., "Effect of microcapsule size on the performance of self-healing polymers," 2007, Polymer 48, 3520-3529.*
"Self-healing: a new paradigm in materials design," M R Kessler, Proc. IMechE vol. 221 Part G: J. Aerospace Engineering.*
"Self-healing: a new paradigm in materials design," 2007, M R Kessler, Proc. IMechE vol. 221 Part G: J. Aerospace Engineering.*
Kessler, M.R et al., "Self-activated healing of delamination damage in woven composites", "Composites Part A: Applied Science and Manufacturing", 2001, pp. 683-699, vol. 32, No. 5.
Sanada, K. et al, "Transverse tensile strength of unidirectional fibre-reinforced polymers and self-healing of interfacial debonding", "Plastics, Rubber and Composites", 2006, pp. 67-72, vol. 35, No. 2.

* cited by examiner

*Primary Examiner* — Mark Ruthkosky
*Assistant Examiner* — Ian Rummel
(74) *Attorney, Agent, or Firm* — Blanchard & Associates

(57) ABSTRACT

A reinforced composite material includes a solid polymer matrix, a reinforcing material in the solid polymer matrix, and a first plurality of capsules. The reinforcing material includes a surface. The capsules are on the surface of the reinforcing material, and include a liquid healing agent. The amount of the healing agent of the capsules is at least 0.01 milligrams per square centimeter of the surface area of the reinforcing material.

17 Claims, 9 Drawing Sheets

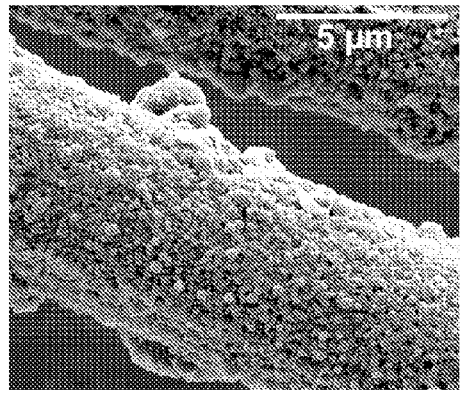 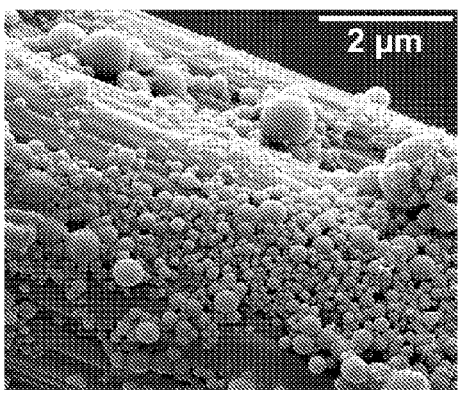
FIG. 4A          FIG. 4B
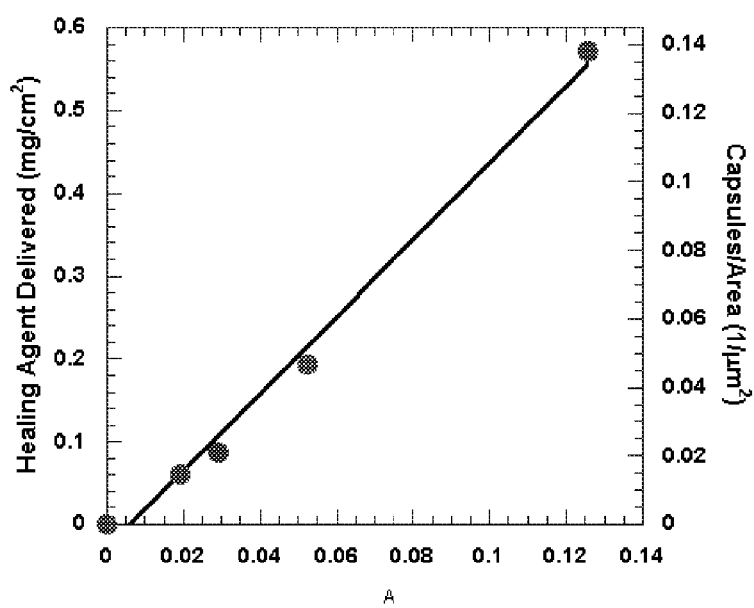
FIG. 5

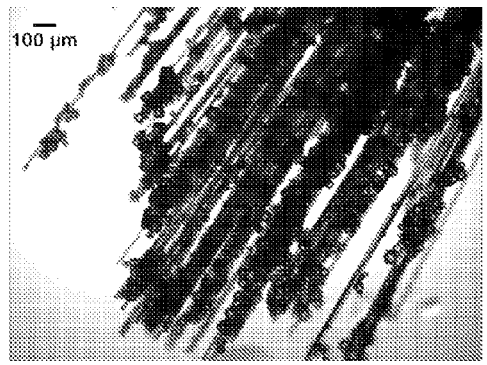
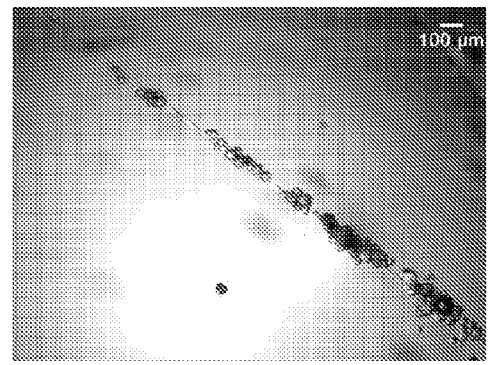
FIG. 9A   FIG. 9B
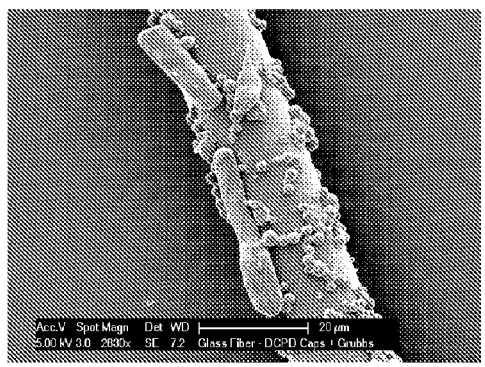
FIG. 10
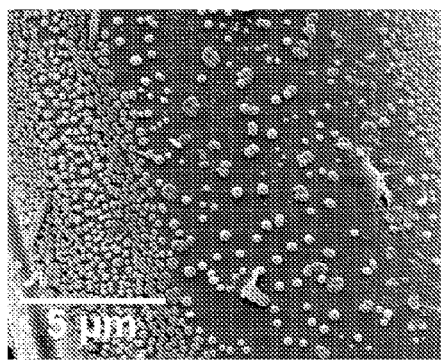
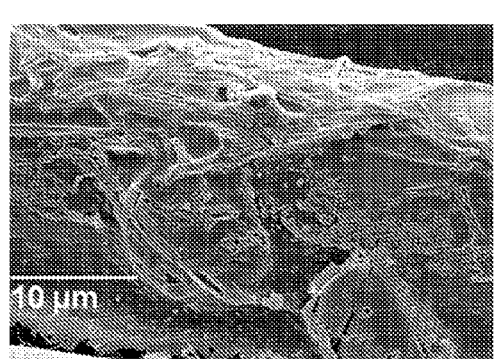
FIG. 11   FIG. 12

INTERFACIAL FUNCTIONALIZATION FOR SELF-HEALING COMPOSITES

REFERENCE TO RELATED APPLICATIONS

This application claims the benefit of U.S. Provisional Application No. 61/090,116 entitled "Interfacial Functionalization For Self-Healing Composites" filed Aug. 19, 2008, which is incorporated by reference in its entirety.

FEDERALLY SPONSORED RESEARCH OR DEVELOPMENT

The subject matter of this application may have been funded in part under a research grant from the Air Force Office of Scientific Research MURI under Grant Number FA9550-06-C-0145) and the National Science Foundation under Grant Number DMI 0328162. The U.S. Government may have rights in this invention.

BACKGROUND

Cracks that form within materials can be difficult to detect and almost impossible to repair. A successful method of autonomically repairing cracks that has the potential for significantly increasing the longevity of materials has been described, for example, in U.S. Pat. No. 6,518,330. This self-healing system includes a material containing, for example, solid particles of Grubbs catalyst and capsules containing liquid dicyclopentadiene (DCPD) embedded in an epoxy matrix. When a crack propagates through the material, it ruptures the microcapsules and releases DCPD into the crack plane. The DCPD then contacts the Grubbs catalyst, undergoes Ring Opening Metathesis Polymerization (ROMP), and cures to provide structural continuity where the crack had been.

A challenge in designing this type of self-healing composite material is that healing usually is possible only when a crack propagates through the bulk matrix material. Thus, the composite material is typically unresponsive to damage that occurs at an interface, such as an interface between the matrix material and a reinforcing material, or an interface between two layers of matrix materials. Since interfacial failure is an important failure mechanism in reinforced composite materials, self-healing of this damage may allow for a further increase in the longevity of a composite material by preventing catastrophic growth of smaller cracks.

It is desirable to provide a self-healing reinforced composite material that can autonomically self-heal when at least a portion of the reinforcing material and the matrix material are separated. It is also desirable to provide a functionalized reinforcing material that can be combined with a matrix to provide such a self-healing composite reinforced material.

SUMMARY

In one aspect, the invention provides a reinforced composite material including a solid polymer matrix; a reinforcing material in the solid polymer matrix, the reinforcing material including a surface; and a first plurality of capsules on the surface of the reinforcing material. The capsules include a liquid healing agent, and the amount of the healing agent of the capsules is at least 0.01 milligrams per square centimeter of the surface area of the reinforcing material.

In another aspect, the invention provides a functionalized reinforcing material including a reinforcing material that includes a surface, and a first plurality of capsules on the surface of the reinforcing material. The capsules include a liquid healing agent, and the amount of the healing agent of the capsules is at least 0.01 milligrams per square centimeter of the surface area of the reinforcing material.

In yet another aspect, the invention provides a method of making a functionalized reinforcing material including attaching a first plurality of capsules to a surface of a reinforcing material, the capsules including a liquid healing agent. The amount of the healing agent of the capsules is at least 0.01 milligrams per square centimeter of the surface area of the reinforcing material.

In yet another aspect, the invention provides a method of making a reinforced composite material including combining a matrix precursor and the functionalized reinforcing material, and solidifying the matrix precursor to form a polymer matrix.

The following definitions are included to provide a clear and consistent understanding of the specification and claims.

The term "polymer" means a substance containing more than 100 repeat units. The term "polymer" includes soluble and/or fusible molecules having long chains of repeat units, and also includes insoluble and infusible networks. The term "prepolymer" means a substance containing less than 100 repeat units and that can undergo further reaction to form a polymer.

The term "matrix" means a continuous phase in a material.

The term "reinforcing material" means a material that, when added to a solid polymer matrix, increases the strength of the matrix relative to the pure polymer. Examples of reinforcing materials include solid particles and fibers.

The term "surface area of the reinforcing material" means the geometric area of the reinforcing material, not including surface features having dimensions less than 100 micrometers.

The term "capsule" means a hollow, closed object having an aspect ratio of 1:1 to 1:10, and that may contain a solid, liquid, gas, or combinations thereof. The aspect ratio of an object is the ratio of the shortest axis to the longest axis, where these axes need not be perpendicular. A capsule may have any shape that falls within this aspect ratio, such as a sphere, a toroid, or an irregular ameboid shape. The surface of a capsule may have any texture, for example rough or smooth.

The term "on", in the context of a reinforcing material and a capsule and/or a particle, means supported by. A capsule and/or particle that is on a reinforcing material may be separated from the reinforcing material by one or more other substances, such as an adhesion promoter or another capsule and/or particle. The capsule and/or particle may or may not be above the reinforcing material during the formation or use of the reinforcing material.

The term "healing agent" means a substance that can contribute to the restoration of structural integrity to an area of a material that has been subjected to damage. Examples of healing agents include polymerizers, activators for polymerizers, solvents, and mixtures of these.

The term "polymerizer" means a composition that will form a polymer when it comes into contact with a corresponding activator for the polymerizer. Examples of polymerizers include monomers of polymers, such as styrene, ethylene, acrylates, methacrylates and dicyclopentadiene (DCPD); one or more monomers of a multi-monomer polymer system, such as diols, diamines and epoxides; prepolymers such as partially polymerized monomers still capable of further polymerization; and functionalized polymers capable of forming larger polymers or networks.

The term "activator" means anything that, when contacted or mixed with a polymerizer, will form a polymer. Examples of activators include catalysts and initiators. A corresponding activator for a polymerizer is an activator that, when contacted or mixed with that specific polymerizer, will form a polymer.

The term "catalyst" means a compound or moiety that will cause a polymerizable composition to polymerize, and that is not always consumed each time it causes polymerization. This is in contrast to initiators, which are always consumed at the time they cause polymerization. Examples of catalysts include ring opening metathesis polymerization (ROMP) catalysts such as Grubbs catalyst. Examples of catalysts also include silanol condensation catalysts such as titanates and dialkyltincarboxylates. A corresponding catalyst for a polymerizer is a catalyst that, when contacted or mixed with that specific polymerizer, will form a polymer.

The term "initiator" means a compound or moiety that will cause a polymerizable composition to polymerize and, in contrast to a catalyst, is always consumed at the time it causes polymerization. Examples of initiators include peroxides, which can form a radical to cause polymerization of an unsaturated monomer; a monomer of a multi-monomer polymer system, such as a diol, a diamine, and an epoxide; and amines, which can form a polymer with an epoxide. A corresponding initiator for a polymerizer is an initiator that, when contacted or mixed with that specific polymerizer, will form a polymer.

The term "solvent", in the context of a healing agent, means a liquid that can dissolve another substance, and that is not a polymerizer.

The term "encapsulant" means a material that will dissolve or swell in a polymerizer and, when combined with an activator, will protect the activator from reaction with materials used to form a solid polymer matrix. A corresponding encapsulant for a solid polymer matrix and for a polymerizer will protect an activator from reaction with materials used to form that specific solid polymer matrix and will dissolve or swell in that specific polymerizer.

The term "adhesion promoter" means a substance that increases the adhesion between two substances, such as the adhesion between two polymers.

The term "matrix precursor" means a composition that will form a polymer matrix when it is solidified. A matrix precursor may include a monomer and/or prepolymer that can polymerize to form a solid polymer matrix. A matrix precursor may include a polymer that is dissolved or dispersed in a solvent, and that can form a solid polymer matrix when the solvent is removed. A matrix precursor may include a polymer at a temperature above its melt temperature, and that can form a solid polymer matrix when cooled to a temperature below its melt temperature.

BRIEF DESCRIPTION OF THE DRAWINGS

The invention can be better understood with reference to the following drawings and description. The components in the figures are not necessarily to scale, emphasis instead being placed upon illustrating the principles of the invention.

FIGS. 4A and 4B are SEM images, at different magnifications, of a functionalized carbon fiber having capsules on the fiber surface.

FIG. 5 is a graph of capsule coverage on fibers (right axis), and of the calculated coverage of healing agent contained in the capsules (left axis), as a function of capsule concentration in an immersion liquid (A).

FIGS. 9A-9B are optical microscopy images of functionalized fibers having capsules and activator particles on the fiber surface. In FIG. 9B, the functionalized fiber is in an epoxy matrix.

FIG. 10 is an SEM image of a functionalized fiber having capsules and activator particles on the fiber surface.

FIG. 11 is an SEM image of a functionalized fiber having Grubbs catalyst platelets on the fiber surface.

FIG. 12 is an SEM image of a fiber coated with poly (DCPD).

DETAILED DESCRIPTION

The present invention is based on the discovery that a reinforced composite material that includes capsules containing a healing agent on the surface of the reinforcing material can self-heal when subjected to interfacial damage, such as a separation of the reinforcing material and the matrix. In contrast to conventional self-healing materials, interfacial damage can trigger the release of a healing agent to the interface between the reinforcing material and the matrix.

Figure 1A:
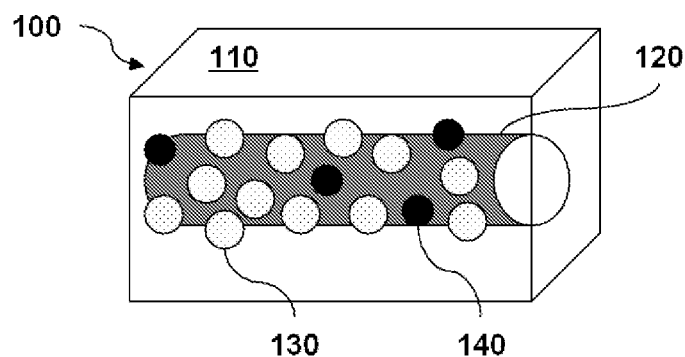
FIG. 1A is a schematic representation of a reinforced composite material.

FIG. 1A is a schematic representation of a reinforced composite material 100 that includes a solid polymer matrix 110, a reinforcing material 120 in the solid polymer matrix, a first plurality of capsules 130, and optionally a plurality of particles 140. The reinforcing material 120 has a surface, and the capsules 130 are on the surface of the reinforcing material. If present, the optional particles 140 also are on the surface of the reinforcing material. The capsules 130 include a liquid healing agent, and the amount of the healing agent is at least 0.01 milligrams per square centimeter of the surface area of the reinforcing material 120.

The solid polymer matrix 110 may include a polyamide such as nylon; a polyester such as poly(ethylene terephthalate) and polycaprolactone; a polycarbonate; a polyether; an epoxy polymer; an epoxy vinyl ester polymer; a polyimide such as polypyromellitimide (for example KAPTAN); a phenol-formaldehyde polymer such as BAKELITE; an amine-formaldehyde polymer such as a melamine polymer; a polysulfone; a poly(acrylonitrile-butadiene-styrene) (ABS); a polyurethane; a polyolefin such as polyethylene, polystyrene, polyacrylonitrile, a polyvinyl, polyvinyl chloride and poly(DCPD); a polyacrylate such as poly(ethyl acrylate); a poly(alkylacrylate) such as poly(methyl methacrylate); a polysilane such as poly(carborane-siloxane); and a polyphosphazene. The solid polymer matrix 110 may include an elastomer, such as an elastomeric polymer, an elastomeric copolymer, an elastomeric block copolymer, and an elastomeric polymer blend. Self-healing materials that include an elastomer as the solid polymer matrix are disclosed, for example, in U.S. Pat. No. 7,569,625 to Keller et al. The solid polymer matrix 110 may include a mixture of these polymers, including copolymers that include repeating units of two or more of these polymers, and/or including blends of two or more of these polymers.

The solid polymer matrix 110 may include other ingredients in addition to the polymeric material. For example, the matrix may contain one or more stabilizers, antioxidants, flame retardants, plasticizers, colorants and dyes, fragrances, or adhesion promoters.

One type of adhesion promoter that may be present includes substances that promote adhesion between the solid polymer matrix 110 and the capsules 130, and/or between the solid polymer matrix 110 and the reinforcing material 120. The adhesion between the matrix and the capsules may influence whether the capsules will rupture or debond when the interface between the matrix and the reinforcing material is damaged. The adhesion between the matrix and reinforcing material may influence the strength and/or toughness of the composite. To promote one or both of these forms of adhesion, various silane coupling agents may be used. Typically, these are compounds of the formula R—SiX$_3$, where R is preferably a reactive group R$^1$ separated by a propylene group from silicon, and X is an alkoxy group (preferably methoxy), such as R$^1$—CH$_2$CH$_2$CH$_2$Si(OCH$_3$)$_3$. Examples include the following silane coupling agents available from DOW CORNING (Midland, Mich.), with the reactive group noted in parentheses: Z6020 (Diamino); Z6030 (Methacrylate); Z6032 (Styrylamine Cationic); Z6040 (Epoxy); and Z6075 (Vinyl). To increase the adhesion between capsules and the solid polymer matrix, the capsules may be treated by washing them in a solution of the coupling agent. For example, urea-formaldehyde capsules may be washed in a solution of silane Z6020 or Z6040 and hexane, followed by adding silane Z6032 to the solid polymer matrix.

Another type of adhesion promoter that may be present includes substances that promote adhesion between the solid polymer matrix 110 and the polymer formed from the healing agent. The adhesion between the matrix and this polymer may influence whether the composite can be healed once damage has occurred. To promote the adhesion between the solid polymer matrix and the polymer formed from the healing agent, various unsaturated silane coupling agents may be used. Typically, these are compounds of the formula R$^2$—SiX'X''X''', where R$^2$ is preferably an unsaturated group R$^3$ separated by a propylene group from silicon; and X', X'' and X''' are independently alkyl or alkoxy, such that at least one of X', X'' and X''' is an alkoxy group (preferably ethoxy), such as R$^3$—CH$_2$CH$_2$CH$_2$—Si(OCH$_2$CH$_3$)$_3$. Examples include silane coupling agents available from GELEST (Morrisville, Pa.), such as (3-acryloxypropyl)trimethoxysilane, (3-acryloxypropyl)-methyldimethoxysilane, methacryloxypropyltrimethoxysilane, methacryloxypropyl-methyldimethoxysilane, methacryloxypropyltriethoxysilane, methacryloxypropyl-methyldiethoxysilane, 3-glycidoxypropyltrimethoxysilane, and N-2-aminoethyl-3-aminopropyl-trimethoxysilane.

The solid polymer matrix 110 may be a self-healing material. In one example, the solid polymer matrix may include a supplemental plurality of capsules that include a supplemental liquid healing agent. In another example, the solid polymer matrix may include a supplemental plurality of particles that include a supplemental activator. In another example, the solid polymer matrix may include both the supplemental plurality of capsules and the supplemental plurality of particles. The capsules of the supplemental plurality may be as described for the capsules 130, below. The supplemental healing agent may be identical to the healing agent of the capsules 130, or it may be different from that healing agent. The particles of the supplemental plurality of particles may be as described for the optional particles 140, below. The supplemental activator may be identical to the activator of the optional particles 140, or it may be different from that activator.

Self-healing materials that may be used as the solid polymer matrix 110 are described, for example, in U.S. Pat. No. 6,518,330 to White et al.; in U.S. Pat. No. 6,858,659 to White et al.; in U.S. Pat. No. 7,566,747 to Moore et al.; in U.S. Patent Application Publication 2006/0111469 with inventors White et al., published May 25, 2006; in U.S. Patent Application Publication 2006/0252852 A1 with inventors Braun et al., published Nov. 9, 2006; in U.S. Patent Application Publication 2007/0166542 A1 with inventors Braun et al., published Jul. 19, 2007; U.S. Pat. No. 7,569,625 to Keller et al.; in U.S. Patent Application Publication 2008/0299391 A1 with inventors White et al., published Dec. 4, 2008; in U.S. Patent Application Publication 2009/0181254 A1 to White et al., published Jul. 16, 2009; in PCT Publication WO 2009/055772 A1, with inventors Caruso et al., published Apr. 30, 2009; and in U.S. Patent Application Publication 2009/0191402 A1, with inventors Beiermann et al., published Jul. 30, 2009.

The reinforcing material 120 may be any material that, when added to a solid polymer matrix, increases the strength of the matrix relative to the pure polymer. The reinforcing material may include a solid particle and/or a fiber, and may include an inorganic and/or an organic material. Examples of particulate reinforcing materials include carbon black, ceramic particles, metal particles, and polymer particles. Examples of fibrous reinforcing materials include graphite fibers, ceramic fibers, metal fibers, and polymer fibers. Examples of graphite reinforcing fibers include Thornel 25 and Modmor. Examples of ceramic reinforcing fibers include metal oxide fibers such as titanium oxide fibers, zirconium oxide fibers and aluminum oxide fibers; silica fibers; and glass fibers, such as E-glass fibers and S-glass fibers. Examples of metal fibers include steel fibers, tungsten fibers, beryllium fibers, and fibers containing alloys of these metals. Examples of polymer fibers include polyester fibers, nylon fibers, rayon fibers, and polyaramid fibers, such as Kevlar 49. Preferably the reinforcing material 120 includes a fiber having an aspect ratio (width:length) of at least 1:5, preferably of at least 1:10, and more preferably of at least 1:100. Reinforcing fibers may be present in a variety of preform types. For example, the fibers may be present as rovings, chopped-strand mat, continuous-strand mat, textile yarn, or fabric roving.

The reinforcing material 120 has a surface having a surface area. The surface area of the reinforcing material 120 is defined as the geometric area of the reinforcing material, not including surface features having dimensions less than 100 micrometers. The surface area of the reinforcing material 120 is determined by measuring the dimensions of the reinforcing material by optical microscopy, and calculating the area of a smoothed envelope surrounding the reinforcing material. For a reinforcing material in the form of a particle, the surface area is calculated as the surface area of a sphere having a diameter equal to the average diameter of the particle. For a reinforcing material in the form of a rod or fiber, the surface area is calculated as the surface area of a cylinder having a diameter equal to the average diameter of the rod or fiber, and having a height equal to the length of the rod or fiber. For a reinforcing material in the form of a web of fibers, the surface area is calculated as the combined surface areas of cylinders having diameters equal to the average diameters of the fibers and having heights equal to the lengths of the fibers, but not including contact areas between the fibers or interstices having a minimum dimension less than 100 micrometers.

The first plurality of capsules 130 isolates the liquid healing agent in the capsules until the composite is subjected to damage that forms a space in the composite. Once the damage occurs, the capsules in contact with the damaged area can rupture, releasing the liquid healing agent into the space. The capsules 130 are on the surface of the reinforcing material 120.

The amount of the healing agent of the capsules 130 is at least 0.01 milligrams per square centimeter ($mg/cm^2$) of the surface area of the reinforcing material 120. Preferably the amount of the healing agent of the capsules is at least 0.05 $mg/cm^2$ of the surface area of the reinforcing material, more preferably is at least 0.1 $mg/cm^2$ of the surface area of the reinforcing material, more preferably is at least 0.5 $mg/cm^2$ of the surface area of the reinforcing material, more preferably is at least 1.0 $mg/cm^2$ of the surface area of the reinforcing material, more preferably is at least 2.0 $mg/cm^2$ of the surface area of the reinforcing material, and more preferably is at least 3.0 $mg/cm^2$ of the surface area of the reinforcing material. Preferably the amount of the healing agent of the capsules 130 is from 0.01 to 10 $mg/cm^2$ of the surface area of the reinforcing material 120, more preferably is from 0.05 to 5 $mg/cm^2$ of the surface area of the reinforcing material, and more preferably is from 0.1 to 3 $mg/cm^2$ of the surface area of the reinforcing material.

The amount of healing agent relative to the surface area of the reinforcing material is determined by measuring the amount of healing agent released from the capsules on the reinforcing material, and dividing this amount (in milligrams) by the surface area of the reinforcing material (in $cm^2$). The amount of liquid healing agent released from the capsules on the reinforcing material is measured by heating the functionalized reinforcing material in a thermogravimetric analysis (TGA) instrument to a temperature that is above the temperature at which the healing agent will volatilize and leave the capsules, but that is below the temperature at which the capsule material, the reinforcing material or any optional adhesion promoter will volatilize. The total weight lost from the material once the healing agent has volatilized and left the capsules is then measured.

The capsules have an aspect ratio of from 1:1 to 1:10, preferably from 1:1 to 1:5, more preferably from 1:1 to 1:3, more preferably from 1:1 to 1:2, and more preferably from 1:1 to 1:1.5. In one example, the capsules may have an average diameter of from 10 nanometers (nm) to 1 millimeter (mm), more preferably from 30 to 500 micrometers, and more preferably from 50 to 300 micrometers. In another example, the capsules may have an average diameter less than 10 micrometers. Capsules having an average outer diameter less than 10 micrometers, and methods for making these capsules, are disclosed, for example, in U.S. Patent Application Publication No. 2008/0299391 A1 to White et al., published Dec. 4, 2008.

The capsules are hollow, having a capsule wall enclosing an interior volume containing a liquid. The thickness of the capsule wall may be, for example, from 30 nm to 10 micrometers. For capsules having an average diameter less than 10 micrometers, the thickness of the capsule wall may be from 30 nm to 150 nm, or from 50 nm to 90 nm. The selection of capsule wall thickness may depend on a variety of parameters, such as the nature of the solid polymer matrix, and the conditions for making and using the composite. For example, a capsule wall that is too thick may not rupture when the interface with which it is in contact is damaged, while a capsules wall that is too thin may break during processing.

Hollow capsules may be made by a variety of techniques, and from a variety of materials. Examples of materials from which the capsules may be made, and the techniques for making them include: polyurethane, formed by the reaction of isocyanates with a diol; urea-formaldehyde (UF), formed by in situ polymerization; gelatin, formed by complex coacervation; polyurea, formed by the reaction of isocyanates with a diamine or a triamine, depending on the degree of crosslinking and brittleness desired; polystyrene or polydivinylbenzene formed by addition polymerization; and polyamide, formed by the use of a suitable acid chloride and a water soluble triamine. For capsules having an average diameter less than 10 micrometers, the capsule formation may include forming a microemulsion containing the capsule starting materials, and forming microcapsules from this microemulsion.

The liquid healing agent of the first plurality of capsules 130 may include, for example, a polymerizer, an activator for a polymerizer, and/or a solvent. The capsules 130 may include other ingredients in addition to the healing agent. For example, the capsules may contain one or more stabilizers, antioxidants, flame retardants, plasticizers, colorants and dyes, fragrances, or adhesion promoters.

The liquid healing agent of the first plurality of capsules 130 may include a polymerizer such as a monomer, a prepolymer, or a functionalized polymer having two or more reactive groups. For example, a polymerizer may include reactive groups such as alkene groups, epoxide groups, amine groups, phenol groups, aldehyde groups, hydroxyl groups, carboxylic acid groups, and/or isocyanate groups. Examples of polymerizers also include lactones (such as caprolactone) and lactams, which, when polymerized, will form polyesters and nylons, respectively.

Examples of polymerizers include alkene-functionalized monomers, prepolymers or polymers, which may form a polymer when contacted with other alkene groups. Examples of alkene-functionalized polymerizers include monomers such as acrylates; alkylacrylates including methacrylates and ethacrylates; olefins including styrenes, isoprene and butadiene; and cyclic olefins including dicyclopentadiene (DCPD), norbornene and cyclooctadiene. Examples of alkene-functionalized polymerizers also include diallyl phthalate (DAP), diallyl isophthalate (DAIP), triallyl isocyanurate, hexane dioldiacrylate (HDDA), trimethylol propanetriacrylate (TMPTA), and epoxy vinyl ester prepolymers and polymers.

Examples of polymerizers also include functionalized siloxanes, such as siloxane prepolymers and polysiloxanes having two or more reactive groups. Functionalized siloxanes include, for example, silanol-functional siloxanes, alkoxy-functional siloxanes, and allyl- or vinyl-functional siloxanes. Self-healing materials that include functionalized siloxanes as polymerizers are disclosed, for example, in U.S. Patent Application Publication 2006/0252852 A1 with inventors Braun et al., published Nov. 9, 2006; and in U.S. Patent Application Publication 2007/0166542 A1 with inventors Braun et al., published Jul. 19, 2007. A healing agent including a functionalized siloxane polymerizer may contain a multi-part polymerizer, in which two or more different substances react together to form a polysiloxane when contacted with an activator. In one example of a multi-part polymerizer, at least one part of the polymerizer can be a polymer containing two or more functional groups. For example, a silanol-functional polysiloxane can react with an alkoxy-functional polysiloxane to form a polysiloxane network. In the reaction of hydroxyl terminated polydimethylsiloxane (HOPDMS) with polydiethoxysiloxane (PDES), an activator such as dibutyltin dilaurate provides for elimination of ethanol and formation of a polydimethylsiloxane network. In the example of a two-part siloxane polymerizer, each of the two parts of the polymerizer may be in separate capsules. The activator for the polymerizer may be in one of these capsules, or it may be in one or more additional capsules.

Examples of polymerizers also include epoxide-functionalized monomers, prepolymers or polymers, which may form an epoxy polymer when contacted with amine groups. For example, an epoxy polymer can be formed by the reaction at or below room temperature (for example, 25° C.) of one compound containing two or more epoxy functional groups with another compound containing either at least one primary amine group or at least two secondary amine groups. Examples of epoxide-functionalized polymerizers include diglycidyl ethers of bisphenol A (DGEBA), such as EPON® 828; diglycidyl ethers of bisphenol F (DGEBF), such as EPON® 862; tetraglycidyl diaminodiphenylmethane (TGDDM); and multi-glycidyl ethers of phenol formaldehyde novolac polymers, such as SU-8. Self-healing materials that include epoxide-functionalized polymerizers are disclosed, for example, in PCT Publication WO 2009/055772 A1, with inventors Caruso et al., published Apr. 30, 2009.

Examples of polymerizers also include amine-functionalized monomers, prepolymers or polymers, which may form an epoxy polymer when contacted with epoxide groups, or which may form an amino polymer when contacted with aldehyde groups. Examples of amine-functionalized polymerizers include aliphatic and aromatic diamines, triamines, and tetramines. Specific examples of amine-functionalized polymerizers include ethanediamine, triethylenetriamine, diethylenetriamine (DETA), hexamethylenetetramine, tetraethylenepentamine (TEPA), urea, melamine, and amine-terminated polymers or prepolymers such as α-aminomethylethyl-ω-aminomethylethoxy-poly[oxy(methyl-1,2-ethanediyl)].

Examples of polymerizers also include phenol-functionalized monomers, prepolymers or polymers, which may form a phenol-formaldehyde polymer when contacted with aldehyde groups, or which may form a polymer when contacted with amine groups. Examples of phenol-functionalized polymerizers include novolac polymers and resole polymers.

Examples of polymerizers also include aldehyde-functionalized monomers, prepolymers or polymers, which may form a phenol-formaldehyde polymer when contacted with phenol groups, or which may form an amino polymer when contacted with amine groups. Examples of aldehyde-functionalized polymerizers include formaldehyde, and include aldehyde-terminated dendrimers such as ald-PAMAM.

Examples of polymerizers also include hydroxyl-functionalized monomers, prepolymers or polymers, which may form a polyester when contacted with carboxylic acid or anhydride groups, or which may form a polyurethane when contacted with isocyanate groups. Examples of hydroxyl-functionalized polymerizers include poly(ethylene glycol), poly(propylene glycol), glycerol, 1,4-butanediol, pentaerythritol, and saccharides.

Examples of polymerizers also include carboxylic acid-functionalized monomers, prepolymers or polymers, which may form a polyester when contacted with hydroxyl groups. Examples of carboxylic acid-functionalized polymerizers include oxalic acid, malonic acid, succinic acid, glutaric acid, adipic acid, maleic acid, and phthalic acid. Examples of polymerizers also include anhydride-functionalized monomers, prepolymers or polymers, which may form a polyester when contacted with hydroxyl groups. Examples of anhydride-functionalized polymerizers include oxalic anhydride, malonic anhydride, succinic anhydride, glutaric anhydride, adipic anhydride, maleic anhydride, and phthalic anhydride.

Examples of polymerizers also include isocyanate-functionalized monomers, prepolymers or polymers, which may form a polyurethane when contacted with hydroxyl groups. In one example, the polymerizer may be a compound containing both an isocyanate group and a hydroxyl group. In another example, the polymerizer may include two different compounds, one compound containing at least two isocyanate groups and the other compound containing at least two hydroxyl groups. Examples of isocyanate-functionalized polymerizers include hexamethylene diisocyanate (HDI), toluene diisocyanate (TDI), methylene diphenyl diisocyanate (MDI), isophorone diisocyanate (IPDI), phenylene diisocyanate, and 1,4-diisocyanatobutane.

The liquid healing agent of the first plurality of capsules 130 may include a solvent. The healing agent may include only one or more solvents, or it may include a polymerizer or an activator in combination with one or more solvents. Examples of healing agents that include a solvent are disclosed, for example, in PCT Publication No. WO 2009/055772 A1, with inventors Caruso et al., published Apr. 30, 2009.

The liquid healing agent may include an aprotic solvent, a protic solvent, or a mixture of these. Examples of aprotic solvents include hydrocarbons, such as cyclohexane; aromatic hydrocarbons, such as toluene and xylenes; halogenated hydrocarbons, such as dichloromethane; halogenated aromatic hydrocarbons, such as chlorobenzene and dichlorobenzene; substituted aromatic solvents, such as nitrobenzene; ethers, such as tetrahydrofuran (THF) and dioxane; ketones, such as acetone and methyl ethyl ketone; esters, such as ethyl acetate and phenyl acetate; tertiary amides, such as dimethyl acetamide (DMA), dimethyl formamide (DMF) and N-methylpyrrolidine (NMP); nitriles, such as acetonitrile; and sulfoxides, such as dimethyl sulfoxide (DMSO). Examples of protic solvents include water; alcohols, such as ethanol, isopropanol, butanol, cyclohexanol, and glycols; and primary and secondary amides, such as acetamide and formamide.

The optional particles 140, when present, are on the surface of the reinforcing material 120. The optional particles 140 may include, for example, an activator, such as a general activator for polymerization, or a corresponding activator for a specific polymerizer present in the composite material. If the liquid healing agent of the first plurality of capsules 130 includes a polymerizer, the optional particles 140 may include a corresponding activator for the polymerizer. The activator may be a catalyst or an initiator. The activator may be present in a mixture with other ingredients, such as one or more stabilizers, antioxidants, flame retardants, plasticizers, colorants and dyes, fragrances, or adhesion promoters. The optional particles may be present in the form of solid particles, or as a second plurality of capsules.

Examples of activators include corresponding catalysts for polymerizable cyclic olefins, including ring opening metathesis polymerization (ROMP) catalysts such as Schrock catalysts and Grubbs catalysts. Examples of activators include corresponding catalysts for lactones and lactams, including cyclic ester polymerization catalysts and cyclic amide polymerization catalysts such as scandium triflate.

Examples of activators include corresponding catalysts for the polymerization of silanol-functional siloxanes with alkoxy-functional siloxanes, such as catalysts that promote silanol condensation or the reaction of silanol with alkoxy-functional siloxane groups. Examples of these catalysts include amines and include metal salts, where the metal can be lead, tin, zirconium, antimony, iron, cadmium, calcium, barium, manganese, bismuth or titanium.

Examples of activators include two-part activators, in which two distinct substances must be present in combination for the activator to function. In one example of a two-part activator system, one part of a catalyst may be a tungsten compound, such as an organoammonium tungstate, an organoarsonium tungstate, or an organophosphonium tungstate; or a molybdenum compound, such as organoammonium molybdate, an organoarsonium molybdate, or an organophosphonium molybdate. The second part of the catalyst may be an alkyl metal halide, such as an alkoxyalkyl metal halide, an aryloxyalkyl metal halide, or a metaloxyalkyl metal halide in which the metal is independently tin, lead, or aluminum; or an organic tin compound, such as a tetraalkyltin, a trialkyltin hydride, or a triaryltin hydride.

In another example of a two-part activator system, a corresponding polymerizer may contain alkene-functional polymerizers. In this example, atom transfer radical polymerization (ATRP) may be used, with one of the activator components being present with the liquid healing agent, and the other activator component acting as the initiator. One component can be an organohalide such as 1-chloro-1-phenylethane, and the other component can be a copper(I) source such as copper(I) bipyridyl complex. In another exemplary system, one activator component could be a peroxide such as benzoyl peroxide, and the other activator component could be a nitroxo precursor such as 2,2,6,6-tetramethylpiperidinyl-1-oxy. These systems are described in Stevens et al., *Polymer Chemistry: An Introduction*, 3rd Edition; Oxford University Press, New York, (1999), pp. 184-186.

In another example of a two-part activator system, a corresponding polymerizer may contain isocyanate functional groups (—N=C=O) and hydroxyl functional groups (—OH), which can react to form a urethane linkage (—NH—C(=O)—O—). In this system, condensation polymerization may be used, with one of the activator components being present with the liquid healing agent, and the other activator component acting as the initiator. For example, one component could be an alkylating compound such as stannous 2-ethylhexanoate, and the other component could be a tertiary amine such as diazabicyclo[2.2.2]octane. These systems are described in Stevens et al., *Polymer Chemistry: An Introduction*, 3rd Edition; Oxford University Press, New York, (1999), pp. 378-381.

The optional particles 140 may include a pure activator in solid form, such as crystals of the activator. These activator particles preferably are microparticles having an average diameter of at most 500 micrometers. Specific examples of pure activators in solid form include solid particles of Grubbs catalyst.

The optional particles 140 may include a mixture of an activator and an encapsulant. These activator particles may be made by a variety of techniques, and from a variety of materials. For example, small particles or a powder of the activator may be dispersed into a liquid containing the encapsulant, followed by solidification of the mixture of encapsulant and activator. These activator particles preferably are microparticles having an average diameter of at most 500 micrometers. The encapsulant preferably is soluble in, or swells in, the liquid healing agent, and is a solid at room temperature. The liquid healing agent may dissolve the encapsulant, releasing the activator and forming a polymer. The liquid healing agent may swell the encapsulant so that the particle can be penetrated by the liquid healing agent sufficiently to allow polymerization of a polymerizer of the liquid healing agent upon contact with the activator. Examples of particles that include an activator and an encapsulant are disclosed, for example, in U.S. Pat. No. 7,566,747 to Moore et al.

The optional particles 140 may include capsules, and a liquid that includes the activator in the capsules. This second plurality of capsules may be as described above for the first plurality of capsules, and may include other ingredients in addition to the activator. For example, the second plurality of capsules may contain one or more stabilizers, antioxidants, flame retardants, plasticizers, colorants and dyes, fragrances, or adhesion promoters.

The reinforced composite material 100 may be self-healing. Since the capsules 130 are on the surface of the reinforcing material 120, they can rupture when contacted by a crack and/or when the reinforcing material 120 is separated from the solid polymer matrix 110. For example, if the composite 100 is subjected to damage that contacts the interface of the solid polymer matrix 110 and the reinforcing material 120, capsules 130 can rupture. The liquid healing agent of the capsules 130 can flow into the space formed by the damage, allowing the components of the composite to bond to each other or to a polymer formed in the space. If optional particles 140 are present as solid particles, the liquid healing agent can contact the particles as the liquid flows into the space. If optional particles 140 are present as a second plurality of capsules, these capsules can rupture, and the liquid that includes the activator can flow into the space and contact the liquid healing agent.

Figure 1B:
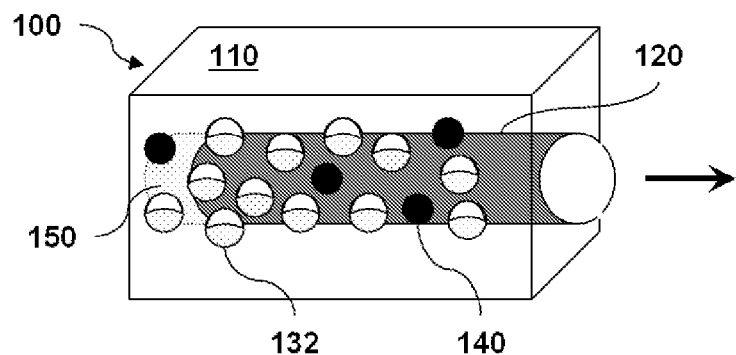
FIG. 1B is a schematic representation of the reinforced composite material of FIG. 1A after interfacial damage has occurred.

FIG. 1B is a schematic representation of the reinforced composite 100 after the reinforcing material 120 has been separated from the solid polymer matrix 110. A space 150 has been formed in the composite due to this separation. The ruptured capsules 132 have released the liquid healing agent, which has flowed into the space 150.

Figure 1C:
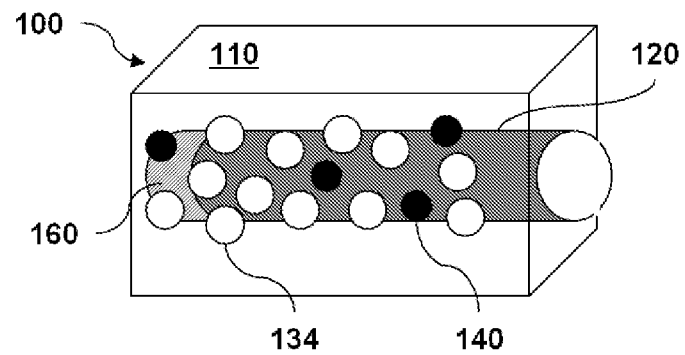
FIG. 1C is a schematic representation of the reinforced composite material of FIG. 1B after self-healing has occurred.

FIG. 1C is a schematic representation of the reinforced composite 100 after the healing agent has formed a new polymer 160 in the space. The empty capsules 134 may also include the new polymer. In addition, although the optional particles 140 are shown, these particles may have disappeared during the healing process, for example by reaction with the healing agent or by dissolving in the liquid healing agent.

Self-healing in the reinforced composite material 100 thus may be triggered by separation of the reinforcing material

120 from the solid polymer matrix 110. This triggering is in contrast to the behavior of a conventional self-healing composite material when combined with a conventional reinforcing material. In this conventional combination, capsules containing a healing agent are distributed throughout the solid polymer matrix, rather than being localized at the interface between the matrix and the reinforcing material. Accordingly, the amount of healing agent that is present in capsules on the surface of the reinforcing material 120 is much lower than for a reinforced composite material 100 having a comparable loading of capsules. In addition, capsules that are present in the matrix of the conventional combination and that happen to be in contact with the interface between the matrix and the reinforcing material are less likely to rupture than are the capsules 130 of the reinforced composite 100. Instead, the capsules in the conventional combination have been observed to debond from the matrix or from the reinforcing material when the matrix and reinforcing material are separated.

Figure 2:
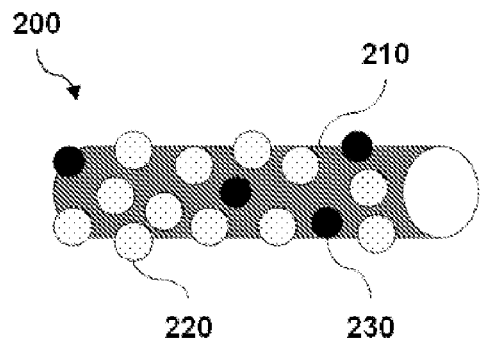
FIG. 2 is a schematic representation of a functionalized reinforcing material.

FIG. 2 is a schematic representation of a functionalized reinforcing material 200 that includes a reinforcing material 210, a first plurality of capsules 220 on the reinforcing material 210, and optionally a plurality of particles 230 on the reinforcing material 210. The first plurality of capsules 220 includes a healing agent, and the amount of the healing agent of the capsules is at least 0.01 $mg/cm^2$ of the surface area of the reinforcing material 210. The reinforcing material 210 may include a particle and/or a fiber, and may include an inorganic and/or an organic material. The reinforcing material 210 may be as described above for the reinforcing material 120.

The first plurality of capsules 220 isolates the liquid healing agent in the capsules. Preferably the amount of the healing agent of the capsules 220 is at least 0.05 $mg/cm^2$ of the surface area of the reinforcing material 210, more preferably is at least 0.1 $mg/cm^2$ of the surface area of the reinforcing material, more preferably is at least 0.5 $mg/cm^2$ of the surface area of the reinforcing material, more preferably is at least 1.0 $mg/cm^2$ of the surface area of the reinforcing material, more preferably is at least 2.0 $mg/cm^2$ of the surface area of the reinforcing material, and more preferably is at least 3.0 $mg/cm^2$ of the surface area of the reinforcing material. Preferably the amount of the healing agent of the capsules 220 is from 0.01 to 10 $mg/cm^2$ of the surface area of the reinforcing material 210, more preferably is from 0.05 to 5 $mg/cm^2$ of the surface area of the reinforcing material, and more preferably is from 0.1 to 3 $mg/cm^2$ of the surface area of the reinforcing material.

The first plurality of capsules 220 may be as described above for the first plurality of capsules 130. The liquid healing agent of the capsules 220 may include, for example, a polymerizer, an activator for the polymerizer, and/or a solvent. The liquid healing agent of the capsules 220 may be as described above for the liquid healing agent of the capsules 130.

The optional particles 230 may include, for example, an activator, such as a general activator for polymerization, or a corresponding activator for a specific polymerizer. If the liquid healing agent of the first plurality of capsules 220 includes a polymerizer, the optional particles 230 may include a corresponding activator for the polymerizer. The optional particles 230 may be as described above for the optional particles 140.

A method of making a functionalized reinforcing material, such as 200, includes attaching a first plurality of capsules to a reinforcing material, where the capsules include a liquid healing agent, such that the amount of the healing agent of the capsules on the reinforcing material is at least 0.01 $mg/cm^2$ of the surface area of the reinforcing material. The method may further include applying an adhesion promoter to the reinforcing material before attaching the capsules to the reinforcing material. The method may further include forming the capsules. The method may further include attaching a plurality of particles, such as particles including an activator, to the reinforcing material. The method may further include forming the particles.

The attaching the first plurality of capsules to the reinforcing material may include contacting the reinforcing material with neat capsules. The attaching the first plurality of capsules to the reinforcing material may include contacting the reinforcing material with a liquid that includes the capsules. Contacting the reinforcing material with a liquid that includes the capsules may include immersing the reinforcing material in the liquid. For a fibrous reinforcing material, this immersion may be done by dipping the fiber in, or dragging the fiber through, a bath of the liquid. Contacting the reinforcing material a liquid that includes the capsules may include contacting the reinforcing material with a sponge soaked in the liquid. Contacting the reinforcing material with a liquid that includes the capsules may include spraying the reinforcing material with the liquid. Preferably the reinforcing material is uniformly coated with the capsules.

A method of making a reinforced composite material, such as 100, may include combining ingredients including a matrix precursor, a reinforcing material, a first plurality of capsules, and optionally a plurality of particles; and solidifying the matrix precursor to form a solid polymer matrix. The first plurality of capsules includes a liquid healing agent. Once the solid polymer matrix has been formed, the amount of the healing agent of the capsules is at least 0.01 $mg/cm^2$ of the surface area of the reinforcing material. If the healing agent includes a polymerizer, the optional particles may include a corresponding activator for the polymerizer. The ingredients may be combined simultaneously, or they may be combined individually, in any order. The solid polymer matrix, the reinforcing material, the first plurality of capsules, and the optional particles may be as described above for the solid polymer matrix 110, the reinforcing material 120, the first plurality of capsules 130, and the optional particles 140, respectively.

The method of making a reinforced composite material may further include forming the first plurality of capsules. The method may further include forming the optional particles, where the optional particles include a corresponding activator for a polymerizer of the capsules. The ingredients may further include other substances, such as stabilizers, antioxidants, flame retardants, plasticizers, colorants and dyes, fragrances, or adhesion promoters.

The method of making a reinforced composite material may include combining a matrix precursor and a functionalized reinforcing material, and solidifying the matrix precursor to form a solid polymer matrix. The functionalized reinforcing material may be the functionalized reinforcing material 200. The matrix precursor and/or the functionalized reinforcing material may further include other substances, such as stabilizers, antioxidants, flame retardants, plasticizers, colorants and dyes, fragrances, or adhesion promoters.

The matrix precursor of these methods may be any substance that can form a solid polymer matrix when solidified. In one example, the matrix precursor includes a monomer and/or prepolymer that can polymerize to form a polymer. The other ingredients may be mixed with the monomer or prepolymer. The matrix precursor may then be solidified by polymerizing the monomer and/or prepolymer of the matrix precursor to form the solid polymer matrix.

In another example, the matrix precursor includes a polymer in a matrix solvent. The polymer may be dissolved or dispersed in the matrix solvent to form the matrix precursor, and the other ingredients then mixed into the matrix precursor. The matrix precursor may be solidified by removing at least a portion of the matrix solvent from the composition to form the solid polymer matrix.

In another example, the matrix precursor includes a polymer that is at a temperature above its melting temperature. The polymer may be melted to form the matrix precursor and then mixed with the other ingredients. The matrix precursor may be solidified by cooling the composition to a temperature below the melt temperature of the polymer to form the solid polymer matrix.

The following examples are provided to illustrate one or more preferred embodiments of the invention. Numerous variations may be made to the following examples that lie within the scope of the invention.

EXAMPLES

Example 1

Formation of Capsules Containing a Healing Agent

Urea-formaldehyde (UF) microcapsules filled with dicyclopentadiene (DCPD) monomer were prepared by in situ polymerization of urea and formaldehyde. An aqueous composition was prepared by combining 20 milliliters (mL) deionized water and 8.5 mL of a 5.0 wt % solution of ethylene-maleic anhydride (EMA) copolymer (Zemac-400 EMA) in water. The aqueous composition was agitated at 800 rpm, at room temperature. Once agitation had begun, a mixture of 0.50 gram (g) urea, 0.05 g resorcinol, and 0.10 g $NH_4Cl$ was added to the composition. DCPD (5.50 mL) containing a small quantity of perylene fluorescent dye was slowly added to the mixture, and agitation was continued for 10 minutes. A tapered ⅛-inch tip sonication horn of a 750-Watt ultrasonic homogenizer (Cole-Parmer) was placed in the mixture and operated for 3 minutes at 40% intensity, to provide approximately 3.0 kiloJoules (kJ) of input energy, while agitation continued. This sonication changed the emulsion from slightly cloudy to opaque white.

Formalin (1.16 g; 37 wt % aqueous solution of formaldehyde) was added, to provide a 1:1.9 molar ratio of formaldehyde to urea, which polymerized to form a urea-formaldehyde polymer. The temperature was raised to 55° C. at a rate of 1° C. per minute. The mixture was agitated at 55° C. for 4 hours, after which the pH was adjusted to 3.50 with sodium hydroxide. The resulting in-water-suspended urea-formaldehyde capsules were centrifuged, decanted and redispersed five times to remove the free surfactant.

The average diameter of the microcapsules was 1.4 micrometers, as determined by focused extinction with an AccuSizer FX focused extinction particle sizer (0.7-20 micrometers). The microcapsules were stable after drying and were homogeneous in size, as determined by Scanning Electron Microscopy (SEM) imaging with a Hitachi and Philips SEM.

Urea-formaldehyde (UF) microcapsules filled with a healing agent other than DCPD monomer were formed using the same procedure, but substituting the other healing agent for the DCPD monomer. In Example 9 below, the DCPD was replaced with a mixture of a solvent and an epoxide polymerizer.

Example 2

Formation of Activator Particles Including an Encapsulant

Particles containing an activator for DCPD were formed by combining the activator with an encapsulant. In an $N_2$-filled glovebox, paraffin wax (Aldrich, 10.0 g, mp=58-62° C.) and Grubbs Catalyst (Strem, 525 mg) were sealed in a vial. The vial was removed from the glovebox. A solution of water (225 mL), poly(ethylene-co-maleic anhydride) (0.63 g, 0.28 wt %) and octanol (1 drop) was placed in a 1000 mL beaker in an 82° C. water bath and stirred with a mechanical stirrer at 900 RPM. The vial containing the wax and the catalyst was submerged in the same 82° C. water bath. After 10 min, the wax had melted and the aqueous solution had reached 65-70° C. The vial with the molten wax was shaken to disperse the catalyst. The vial was then opened (in air), and the wax was poured into the aqueous solution. After 2 min, cold water (600 mL, 0° C.) was quickly added, and the stirring was stopped. The particles were collected by filtration and dried under vacuum. The average diameter of the particles was 20-30 micrometers.

Example 3

Formation of Functionalized Reinforcing Material Coated with Capsules Containing a Polymerizer Functionalized reinforcing materials were formed by attaching the capsules of Example 1 to glass fibers, to carbon fibers, or to metal fibers. The capsules were attached by immersing the fibers in a liquid containing the capsules.

Figure 3A:
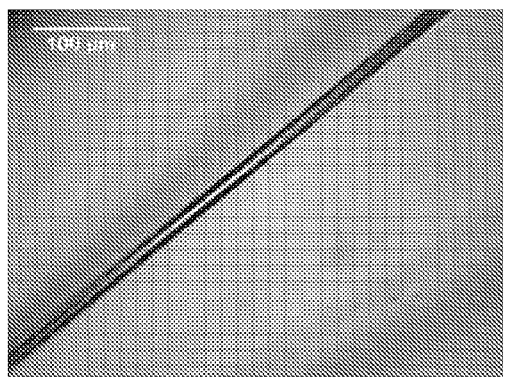
FIGS. 3A and 3B are optical microscopy images of a bare E-glass fiber (3A), and of a functionalized E-glass fiber having capsules on the fiber surface (3B).
Figure 3B:
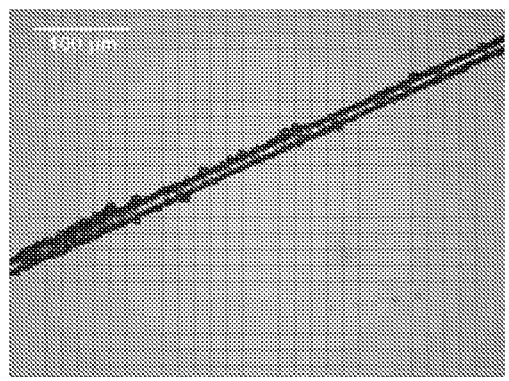
Figure 3C:
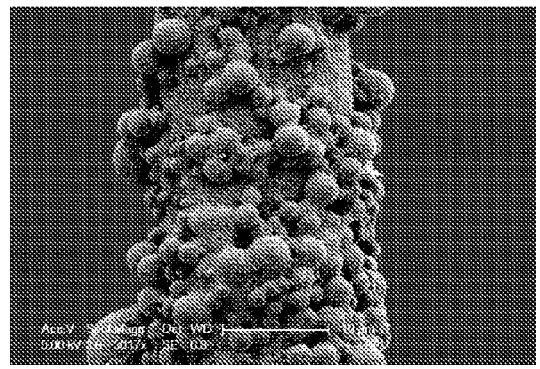
FIG. 3C is a scanning electron microscopy (SEM) image of a functionalized fiber having capsules on the fiber surface.

E-Glass fibers (OC SE 2350; OWENS-CORNING) treated with APS sizing were immersed in a liquid containing the capsules of Example 1 (~12 weight percent by volume (% wt/vol)) and 1.25 weight percent (wt %) of a poly(ethylene-co-maleic anhydride) (EMA) surfactant, where the liquid was at pH 2.2. The fibers were immersed in the capsule liquid for 5 minutes, removed, and then dried by hanging vertically. FIGS. 3A and 3B are optical microscopy images of the bare E-glass fiber (3A) and the functionalized fiber having the capsules on the fiber surface (3B). FIG. 3C is an SEM image of the functionalized fiber having the capsules on the fiber surface.

Carbon fibers (3K, 2×2 Twill Weave Carbon Fiber; FIBER-GLAST) were immersed in a liquid containing the capsules of Example 1, as described for the E-glass fibers. FIGS. 4A and 4B are SEM images, at different magnifications, of the coated fibers.

Steel fibers were immersed in a liquid containing the capsules of Example 1, as described for the E-glass fibers. The coated fibers were imaged by fluorescent microscopy, since the capsules could be observed due to the fluorescence of the parylene dye in the DCPD liquid composition.

Example 4

Control of Capsule Coverage on Reinforcing Material

The concentration of capsules containing a polymerizer on fibers could be controlled by changing the concentration of the capsules in the immersion liquid. E-glass fibers were coated with capsules as described in Example 3, except that the concentration of capsules in the liquid ranged from 0 grams per milliliter (g/mL) to 0.13 g/mL.

The coverage of capsules on the fiber was determined from SEM images of the functionalized reinforcing material. Using image analysis software, an SEM micrograph of the surface was digitally converted to a threshold image, showing areas of capsule and areas of uncoated fiber. The pixels of each area were summed to give an approximate coverage fraction. Optionally, capsules could be manually counted over a particular area, the size of the capsules could be analyzed with a particle sizer instrument, and these measurements combined to determine an approximate surface coverage of the fiber.

FIG. 5 is a graph of capsule coverage on the fiber (in capsules per square micrometer of the fiber surface area; right axis) as a function of capsule concentration in the liquid (A; g/mL). The coverage of capsules on the fiber increased linearly with the concentration of capsules in the liquid. The capsule coverage for the fiber immersed in the liquid having a capsule concentration of 0.13 g/mL was calculated as 1.4 capsules per square micrometer. FIG. 5 also shows the calculated amount of healing agent contained in the capsules per square centimeter of the fiber surface area (in mg/cm$^2$; left axis), as a function of capsule concentration in the liquid (A; mg/mL). The amount of healing agent for the fiber immersed in the liquid having a capsule concentration of 0.13 g/mL was calculated as 0.58 mg/cm$^2$.

In related studies, functionalized fibers were formed having a capsule coverage of 0.488 capsules per square micrometer of the fiber surface area, and having 2.01 mg healing agent per square centimeter of the fiber surface area. Functionalized fibers may be formed having a capsule coverage of at least 0.6-0.8 capsules per square micrometer of the fiber surface area, and having at least 2.5-3.0 mg healing agent per square centimeter of the fiber surface area.

Figure 6:
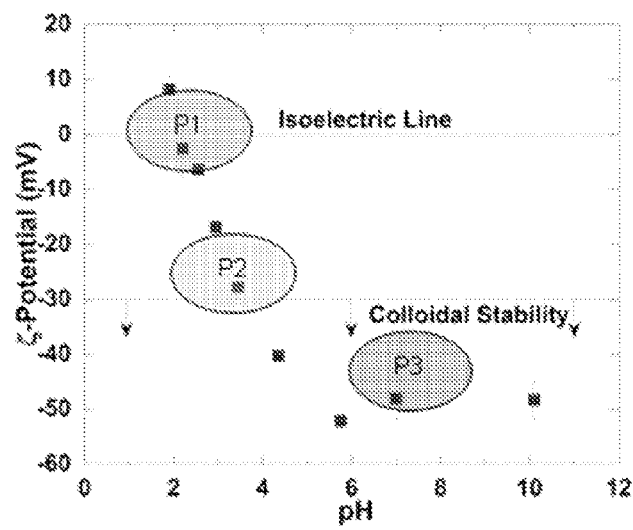
FIG. 6 is a graph of the zeta potential ($\zeta$-potential) of capsules as the pH of a liquid containing the capsules was increased from 2.05 to 10.
Figure 7A:
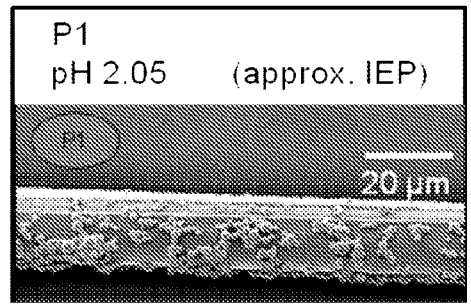
FIGS. 7A-7C are SEM images of functionalized fibers coated with capsules by immersion in liquids containing the capsules at different pH values.
Figure 7B:
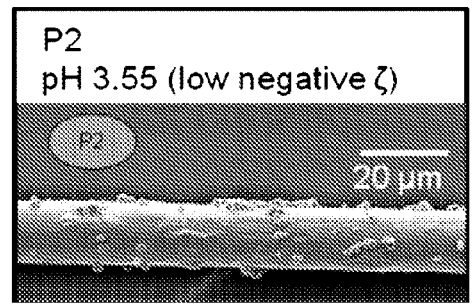
Figure 7C:
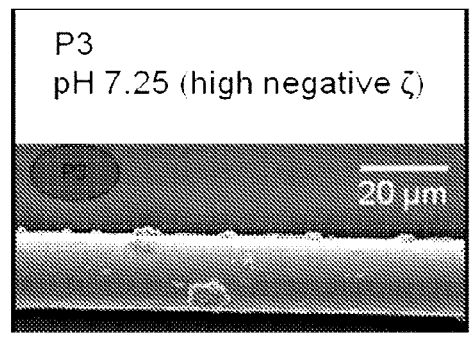
Figure 8A:
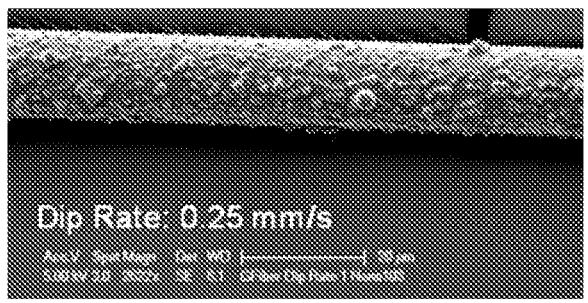
FIGS. 8A-8D are SEM images of functionalized fibers coated with capsules by vertically immersing the fibers in a liquid containing the capsules, and then drawing the fibers out of the liquid at different rates.
Figure 8B:
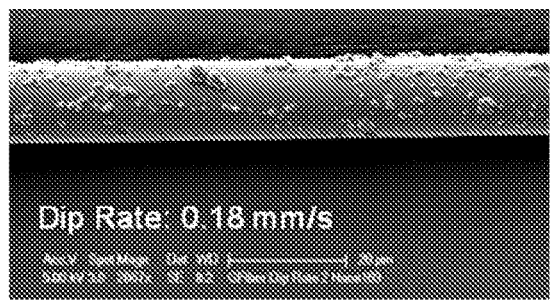
Figure 8C:
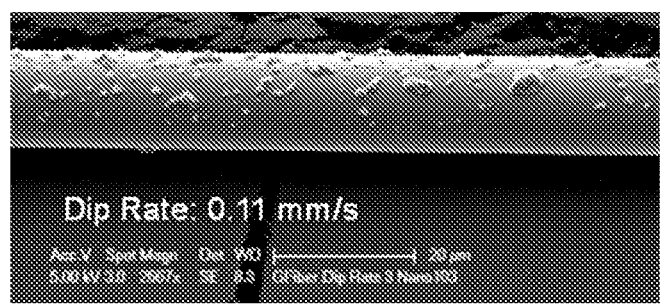
Figure 8D:
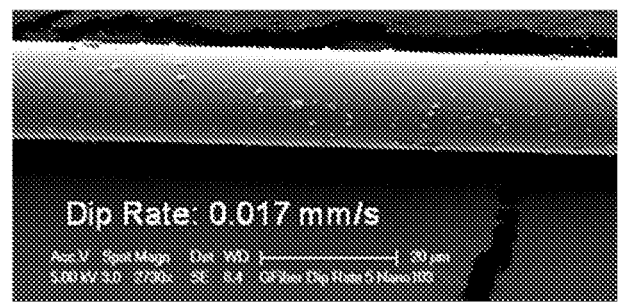

The concentration of capsules containing a polymerizer on fibers could be controlled by changing the pH of the immersion liquid. FIG. 6 is a graph of the zeta potential ($\zeta$-potential) of the capsules as the pH of the liquid was increased from 2.05 to 10. The isoelectric point (IEP; $\zeta$-potential=0) for the capsules occurred around pH=2. Capsule coverage was highest when the $\zeta$-potential of the capsules in the immersion liquid was approximately zero. FIGS. 7A, 7B and 7C are SEM images of glass fibers coated with capsules by immersion in liquids containing the capsules (~12% wt/vol) and 1.25 wt % EMA surfactant, and having a pH of 2.05, 3.55 and 7.25, respectively. As the pH increased, the $\zeta$-potential of the capsules also increased, and the capsule coverage decreased.

The concentration of capsules containing a polymerizer on fibers could be controlled by changing the speed at which the fiber was drawn out of the immersion liquid. FIGS. 8A-8D are SEM images of glass fibers coated with capsules by vertically immersing the fibers in a liquid containing the capsules (~12% wt/vol) and 1.25 wt % EMA surfactant, and having a pH of 2.05, and then drawing the fibers out at a rate of 0.25 millimeters per second (mm/s), 0.18 mm/s, 0.11 mm/s and 0.017 mm/s, respectively. A faster dip rate provided an increase in coverage of the capsules on the fibers.

Example 5

Formation of Functionalized Reinforcing Material Coated with Capsules Containing a Polymerizer, and with Activator Particles Functionalized reinforcing materials were formed by attaching the capsules of Example 1 and the particles of Example 2 to glass fibers. The capsules were attached by immersing the fibers in a liquid containing the capsules. The particles were the attached by contacting the fibers, with attached capsules, with a neat activator.

For activator particles containing the activator combined with an encapsulant, the coating process was similar to the immersion process of Example 3, except that the immersion liquid also contained the activator particles of Example 2. FIG. 9A is an optical microscopy image of a bundle of functionalized E-glass fibers having capsules and activator particles on the surfaces of the fibers. FIG. 9B is an optical microscopy image of a single functionalized E-glass fiber having capsules and activator particles on the fiber surface, where the fiber has been embedded in an epoxy matrix.

For activator particles containing the pure activator in solid form, a two-step coating process was used. In the first step, E-glass fibers were immersed in a liquid containing the capsules and 1.25 weight percent (wt %) of a poly(ethylene-co-maleic anhydride) (EMA) surfactant, having a pH of 2.2, as described for Example 3. In the second step, the fibers that had been immersed for 5 minutes were dragged through a powder sample of Grubbs catalyst. The coated fibers were dried by hanging vertically. FIG. 10 is an SEM image of a functionalized fiber having capsules and activator particles on the fiber surface.

Example 6

Formation of a Functionalized Reinforcing Material Coated with Activator Particles Functionalized reinforcing materials were formed by attaching particles of a pure activator in solid form to glass fibers. The particles were the attached by contacting the fibers with liquid containing the activator.

A glass fiber or fiber bundle was dipped into a solution of Grubbs catalyst in excess acetone, and then quickly removed. Evaporation of the acetone from the fiber provided for recrystallization of the Grubbs catalyst on the fiber surface in the form of platelets. FIG. 11 is an SEM image of a fiber having Grubbs catalyst platelets on its surface.

The reactivity of the catalyst on the fiber surface was tested by immersing the functionalized fiber in DCPD. The Grubbs catalyst on the fiber surface initiated a ROMP reaction with the DCPD, and a thick poly-DCPD film was deposited on the fiber surface. FIG. 12 is an SEM image of a fiber coated with poly(DCPD) formed from the reaction of Grubbs catalyst on the surface of the fiber with DCPD.

Example 7

Testing of Behavior of Capsules Containing a Polymerizer During Interfacial Failure A reinforced composite material was formed by combining a metal fiber coated with capsules that included a healing agent, with precursors for an epoxy polymer. The reinforced composite was tested to failure, and the behavior of the capsules was examined.

Figure 13A:
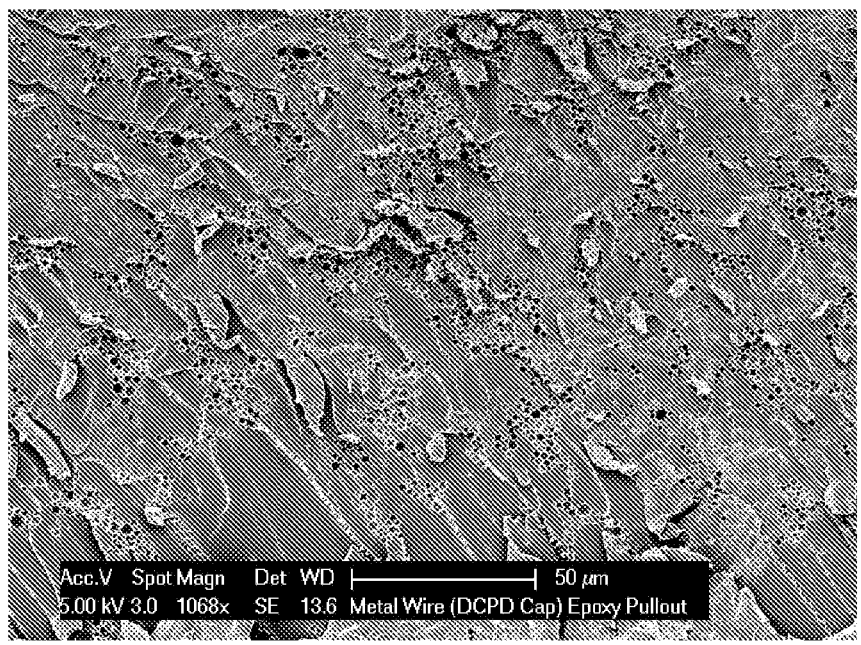
FIGS. 13A and 13B are SEM images, at different magnifications, of the interfacial surface of an epoxy portion of a composite sample after failure.
Figure 13B:
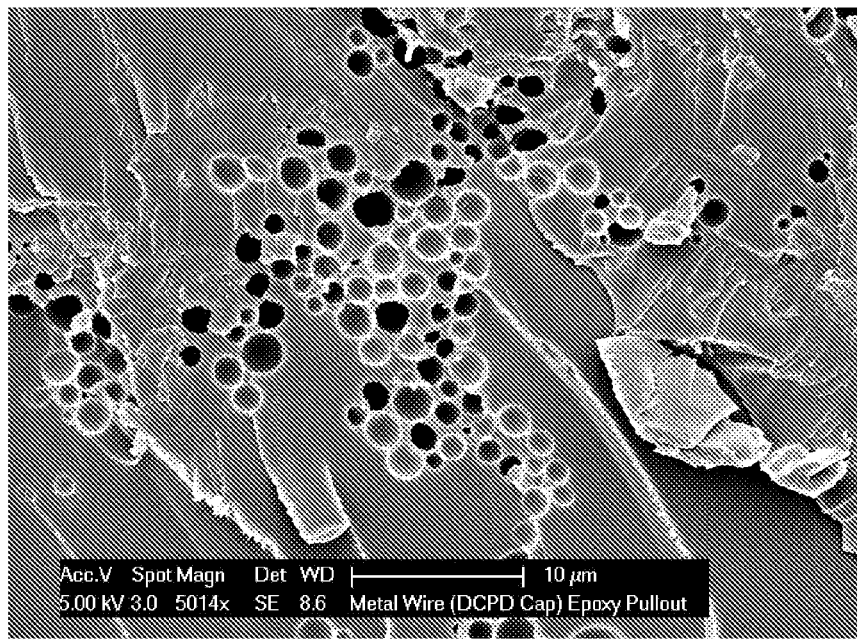

A metal wire was coated with capsules containing DCPD, as described in Example 3. An epoxide polymerizer (EPON® 828; MILLER-STEPHENSON; Danbury, Conn.) was mixed with a diethylenetriamine curing agent Ancamine® DETA (AIR PRODUCTS; Allentown, Pa.). The EPON® 828 epoxide polymerizer included a diglycidyl ether of bisphenol A (DGEBA). One end of the coated metal wire was embedded into the mixture. Approximately 1-2 mm of the wire was exposed at the other end. The epoxide mixture was cured to form an epoxy thermoset. The wire and the cured epoxy were secured in opposite ends of a tensile tester, and the sample was then tested in tension to failure. FIGS. 13A and 13B are SEM images, at different magnifications, of the interfacial surface of the epoxy portion of the sample after failure. Ruptured capsules were visible in the SEM images, indicating that the capsules ruptured and released their contents when the fiber was pulled out from the epoxy matrix. This is in contrast to capsule debonding during interfacial failure, which would not result in a release of the healing agent into the interfacial region.

Example 8

Formation of a Macroscopic Composite Containing Functionalized Woven Fibers

Figure 14:
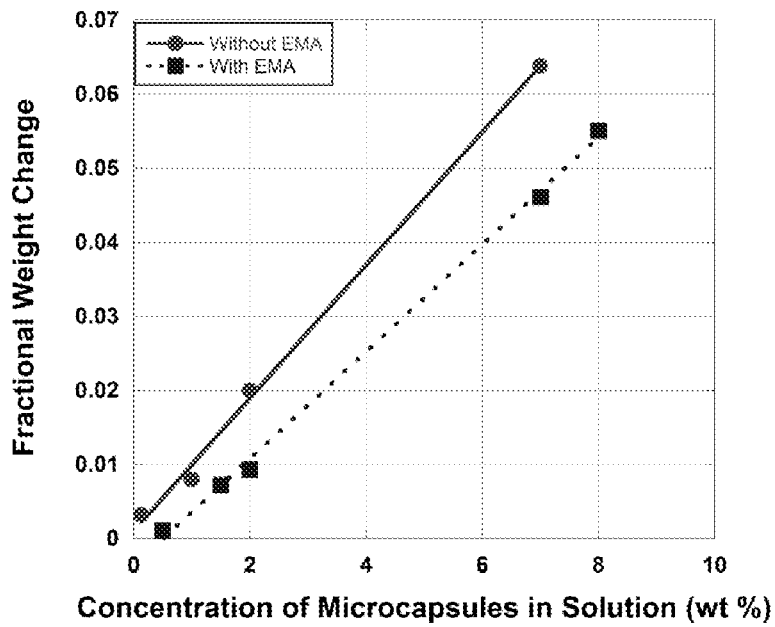
FIG. 14 is a graph of weight change of fibers as a function of microcapsule concentration in a soaking liquid.

The formation of a functionalized reinforcing material and its incorporation into composites was scaled up from the microscale to a macroscopic composite. A ply of woven glass fibers (OC SE 2350; OWENS-CORNING) was cut into a 2 inch square and placed in a liquid containing the capsules of Example 1 and having a pH of 2.2, either with or without 1.25 wt % of EMA surfactant. The glass ply was removed after 10 minutes and placed on a plastic sheet to dry. The dried ply was weighed after 12 hours to determine the mass of capsules (and optionally EMA) on the fibers. FIG. 14 is a graph of the weight change as a function of microcapsule concentration in the soaking liquid. The dashed line corresponds to the liquid containing EMA, and the solid line corresponds to the liquid without EMA.

Figure 15:
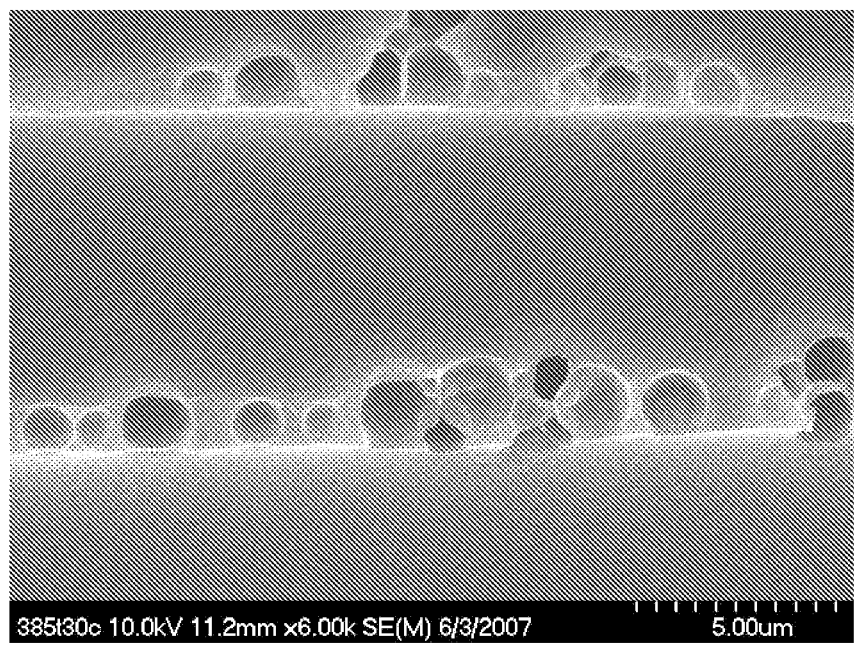
FIG. 15 is an SEM image of a fiber debonded region of a fractured composite.

A ply of the fibers having capsules on the fiber surfaces was combined with an epoxy resin, subjected to 100 pounds of pressure (approximately 10 pounds per square inch (psi)), and the epoxy resin was cured. The resulting composite was fractured, and the fracture surface was examined by SEM. FIG. 15 is an SEM image of a fiber debonded region of the fractured composite, showing ruptured capsules at the interface between the fiber surface and the epoxy matrix.

Example 9

Formation of Activator Capsules Containing a Solvent and a Polymerizer

Capsules containing a liquid healing agent including a solvent and a polymerizer were prepared. Urea-formaldehyde (UF) microcapsules were formed as described in Example 1, but replacing the DCPD monomer with mixture of 0.60 g of EPON® 828 epoxide polymerizer and 4.90 g of solvent. For a first set of capsules, the solvent was ethyl phenylacetate. For a second set of capsules, the solvent was hexyl acetate. This second set of capsules provided a control system, since hexyl acetate has been shown to provide only minimal self healing in epoxy systems (Caruso, M. M. et al. *Advanced Functional Materials*, 18(13), pp. 1898-1904 (2008)).

Example 10

Tensile Testing of Single Fiber Composites

Composite samples were prepared that contained a single fiber embedded in a polymer matrix. A polymerization mixture was prepared by mixing EPON® 828 (MILLER-STEPHENSON; Danbury, Conn.) and diethylenetriamine curing agent Ancamine® DETA (AIR PRODUCTS; Allentown, Pa.) at a ratio of 100:12 parts per hundred (pph) by weight. This mixture was applied to one end of the fiber, and the application was precisely controlled to provide controlled embedded lengths ($L_e$) ranging from 100 micrometers to 1 mm. The mixture was allowed to cure for 24 h at room temperature, followed by 24 h at 35° C. Self-healing composite samples included the EPON® 828/ethyl phenyl acetate capsules of Example 9. Control composite samples included a bare glass fiber.

These samples were tested in tension, and damage was typically initiated at the fiber-matrix interface. For the tension testing, a custom-made single fiber tensile testing frame was mounted under an optical microscope. The frame was equipped with a 1.5 Newton (N) load cell (HONEYWELL SENSOTEC), and an actuator with a 12 nm step size (M-250S; PI (Physik Instrumente) L.P.). The small step size allowed for efficient testing at loading rates as low as 250 nanometers per second (nm/s) without loss of resolution. A loading rate of 500 nm/s was preferred for the testing. This testing frame provided load-displacement measurements, simultaneously with direct optical observations of propagation of the crack front during debonding, failure, and subsequent healing of the composite sample. These measurements and observations of fiber-matrix interfacial fracture toughness, interfacial shear strength, and fiber-matrix load transfer were used to quantify the self-healing effect in the composite samples.

Figure 16:
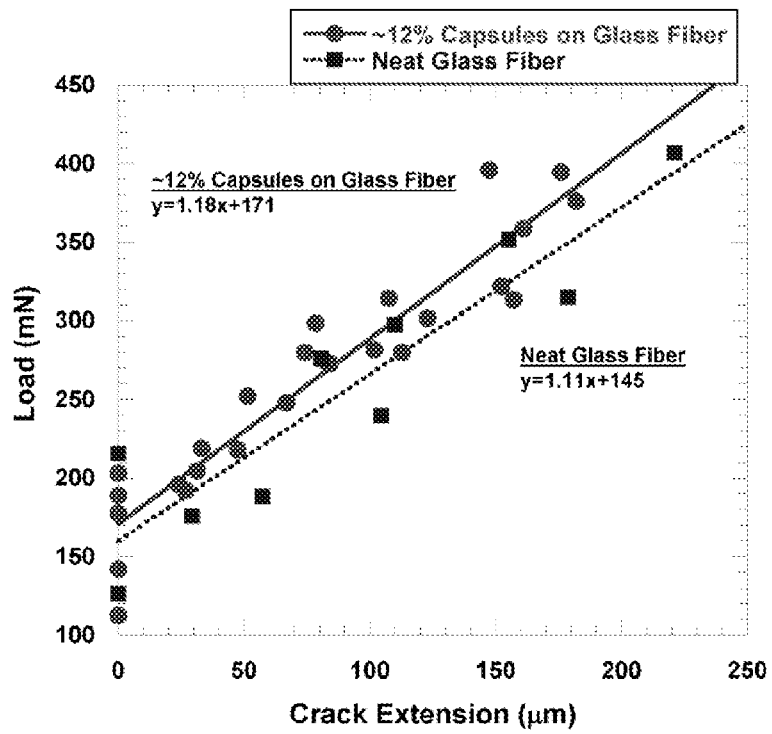
FIG. 16 is a graph of applied load as a function of crack length for a composite sample including a functionalized fiber having a 12% coverage of capsules on the fiber surface (solid line), and for a control composite including a bare fiber (dashed line).

FIG. 16 is a graph of the applied tensile load as a function of crack length for a composite including a functionalized fiber having a 12% coverage of capsules (solid line), and for a control composite including a bare fiber (dashed line). These results indicated that the self-healing composite had a slightly increased crack initiation load, as well as a larger slope of the line for the load versus crack length. One possible explanation for these results is that the self-healing composite had increased interfacial roughness relative to the control composite, due to the microcapsules and/or ruptured microcapsules along the crack interface.

Example 11

Self-Healing Performance of Single Fiber Composites

Reinforced composite materials were formed by combining single fibers with precursors for an epoxy polymer. The single fibers were either functionalized fibers, fibers having inert capsules on their surfaces, or bare fibers. The failure behavior and self-healing properties of the reinforced composites were measured and compared.

Functionalized reinforcing fibers were formed by coating E-glass fibers with the capsules containing epoxide polymerizer and phenyl acetate of Example 9. The coating process was as described in Example 3. A first set of control fibers was formed by coating E-glass fibers with the capsules containing epoxide polymerizer and hexyl acetate of Example 9, using the coating process of Example 3. A second set of control fibers included bare E-glass fibers.

Composite samples were formed by incorporating one of these fibers into an epoxy matrix, using the process of Example 10. Self-healing composite samples included the functionalized reinforcing fibers. Control composite samples included a control fiber from either the first set of control fibers or the second set of control fibers.

Figure 17:
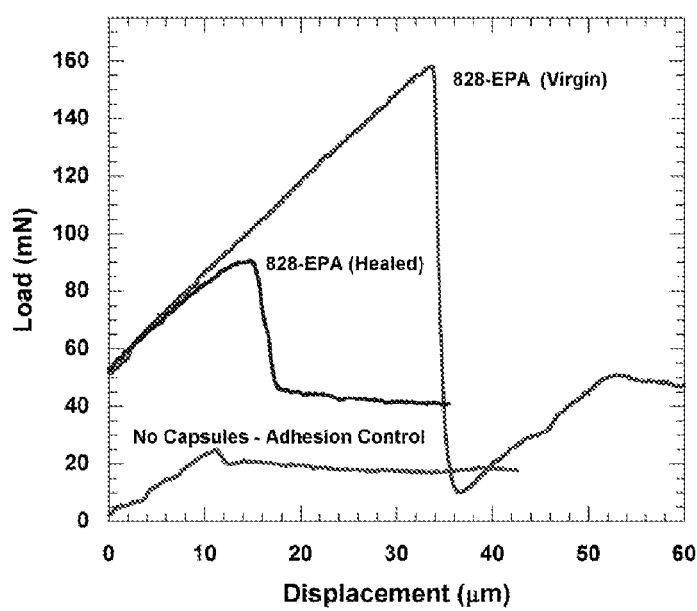
FIG. 17 is a graph of load as a function of fiber displacement for a self-healing composite sample including a functionalized fiber, and for a control sample without capsules.

These samples were tested in the tensile testing frame of Example 10. FIG. 17 is a graph of load (P) as a function of fiber displacement for a self-healing reinforced composite sample before and including initial failure, for the failed sample after 24 hours of self-healing at room temperature, and for a control reinforced composite sample without capsules on the fiber surface. The healing efficiency ($\eta$) for the self-healing reinforced composite was defined as the healed peak load ($P_h$) above the frictional load ($P_{friction}$) normalized by the virgin peak load ($P_v$):

$$\eta = (P_h - P_{friction})/(P_v - P_{friction}) \quad \text{Equation 1.}$$

The self-healing samples showed a maximum healing efficiency ($\eta$) of 43%, and an average healing efficiency of 35%. These results may be lower than the actual healing efficiencies, since the sample tops tended to break during testing, leaving no bond surface when the fiber was fully debonded.

In contrast, no healing was observed for either set of control samples. For the control samples, the measured load at 24 hours after failure corresponded to the frictional load between the fiber and the epoxy matrix. These results indicated that self-healing can occur when a healing agent is present in capsules on the surface of a reinforcing material. Self-healing did not occur when the capsules did not include a healing agent, or when the capsules were absent. Thus, the healing in the self-healing reinforced composites was not due to the presence of capsules in general, nor was it due to simple re-adhesion of the reinforcing material to the matrix.

The testing was performed again, but using composite samples that extended farther along the fiber. This configuration provided for crack propagation without complete interfacial failure. A small interfacial crack was allowed to propagate along the fiber-matrix interface for a distance of from 50 to 100 micrometers. A protective brace was then placed on the sample, and the sample was held in the brace for 24 hours. The samples were then tested again. The healing efficiencies were calculated as the percent of recovered elastic modulus in the sample after healing above the damaged elastic modulus:

$$\eta = (E_h - E_d)/(E_i - E_d) \quad \text{Equation 2}$$

where $E_h$ is the slope of the load-displacement for the healed sample, $E_d$ is the slope of the load-displacement for the damaged sample, and $E_i$ is the slope of the load-displacement for the initial undamaged sample. These slopes were determined using a MATLAB (MathWorks) script to obtain the best fit line with at least 100 data points in the appropriate region for each fit.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A reinforced composite material, comprising:
a solid polymer matrix,
a reinforcing material in the solid polymer matrix, the reinforcing material comprising a surface,
a first plurality of capsules on the surface of the reinforcing material; and
an adhesion promoter between the reinforcing material and the first plurality of capsules,
where the capsules have an average diameter of from 10 nanometers to 10 micrometers, and comprise a liquid healing agent, and
where the amount of the healing agent of the capsules is from 0.01 to 10 milligrams per square centimeter of the surface area of the reinforcing material.

2. The reinforced composite material of claim 1, where the amount of the healing agent of the capsules is from 0.1 to 3 milligrams per square centimeter of the surface area.

3. The reinforced composite material of claim 1, where the solid polymer matrix comprises an adhesion promoter.

4. The reinforced composite material of claim 1, where the solid polymer matrix comprises a supplemental plurality of capsules comprising a supplemental liquid healing agent.

5. The reinforced composite material of claim 4, where the supplemental healing agent is identical to the healing agent of the first plurality of capsules.

6. The reinforced composite material of claim 4, where the supplemental healing agent is different from the healing agent of the first plurality of capsules.

7. The reinforced composite material of claim 4, where the solid polymer matrix comprises a supplemental plurality of particles comprising a supplemental activator.

8. The reinforced composite material of claim 1, where the healing agent comprises at least one member selected from the group consisting of a polymerizer, an activator, and a solvent.

9. The reinforced composite material of claim 1, where the healing agent comprises a polymerizer.

10. The reinforced composite material of claim 9, further comprising a plurality of particles on the surface of the reinforcing material;
where the particles comprise a corresponding activator for the polymerizer.

11. The reinforced composite material of claim 10, where the particles comprise the corresponding activator in a solid form.

12. The reinforced composite material of claim 10, where the particles comprise the corresponding activator and an encapsulant.

13. The reinforced composite material of claim 10, where the particles comprise a second plurality of capsules, and the corresponding activator is in the second plurality of capsules.

14. A method for making a reinforced composite material, comprising:
applying an adhesion promoter to a reinforcing material;
attaching a first plurality of capsules to a surface of the reinforcing material, to form a functionalized reinforcing material,
combining a matrix precursor and the functionalized reinforcing material, and solidifying the matrix precursor to form a reinforced polymer matrix,
the capsules having an average diameter of from 10 nanometers to 10 micrometers, and comprising a liquid healing agent;
where the amount of the healing agent of the capsules is from 0.01 to 10 milligrams per square centimeter of the surface area of the reinforcing.

15. The method of claim 14, where the attaching comprises contacting the reinforcing material with neat capsules.

16. The method of claim 14, where the attaching comprises contacting the reinforcing material with a liquid comprising the capsules.

17. The method of claim 16, where the liquid further comprises a plurality of particles comprising an activator.

* * * * *